(12) United States Patent
Hayakawa et al.

(10) Patent No.: US 7,568,849 B2
(45) Date of Patent: Aug. 4, 2009

(54) LIGHT QUANTITY ADJUSTING DEVICE

(75) Inventors: Yukihiko Hayakawa, Kofu (JP); Kenji Masuyama, Kofu (JP); Takahiro Nishimoto, Nirasaki (JP)

(73) Assignee: Nisca Corporation, Minamikoma-Gun, Yamanashi (JP)

( * ) Notice: Subject to any disclaimer, the term of this patent is extended or adjusted under 35 U.S.C. 154(b) by 385 days.

(21) Appl. No.: 11/723,244

(22) Filed: Mar. 19, 2007

(65) Prior Publication Data

US 2007/0297792 A1 Dec. 27, 2007

(30) Foreign Application Priority Data

Jun. 26, 2006 (JP) .............................. 2006-174802

(51) Int. Cl.
*G03B 9/02* (2006.01)

(52) U.S. Cl. ....................................... 396/505; 396/506

(58) Field of Classification Search ................ 396/352, 396/355, 452–456, 463, 467, 469, 506, 508
See application file for complete search history.

(56) References Cited

U.S. PATENT DOCUMENTS

| | | | |
|---|---|---|---|
| 4,458,998 A * | 7/1984 | Tanaka et al. ................ | 396/355 |
| 4,881,093 A * | 11/1989 | Dowe ......................... | 396/463 |
| 5,262,812 A * | 11/1993 | Fukasawa ................... | 396/455 |
| 5,689,746 A * | 11/1997 | Akada et al. ................ | 396/508 |
| 6,806,985 B1 * | 10/2004 | Devenyi ...................... | 359/230 |
| 6,866,431 B2 * | 3/2005 | Namazue et al. ............ | 396/450 |
| 2004/0258405 A1 * | 12/2004 | Shiratori et al. ............. | 396/458 |
| 2005/0008358 A1 * | 1/2005 | Kanome et al. ............. | 396/450 |
| 2005/0152691 A1 * | 7/2005 | Kawauchi et al. ........... | 396/463 |
| 2006/0002702 A1 * | 1/2006 | Masuda et al. .............. | 396/510 |
| 2007/0110432 A1 * | 5/2007 | Viglione et al. ............. | 396/465 |

FOREIGN PATENT DOCUMENTS

JP H11-194384 7/1999

* cited by examiner

*Primary Examiner*—W B Perkey
*Assistant Examiner*—Warren K Fenwick
(74) *Attorney, Agent, or Firm*—Manabu Kanesaka

(57) ABSTRACT

A light quantity adjusting device prevents possible violent vibration resulting from an external force. The light quantity adjusting device includes a substrate having an optical path aperture, a blade movably placed on the substrate to restrict the quantity of light passing through the optical path aperture, and an electromagnetic driving device for drivingly opening and closing the blade. The electromagnetic driving device includes a rotating shaft, an arm integrated with the rotating shaft, and a transmission pin provided on the arm. The blade has a cam groove formed therein and engaging the transmission pin. The cam groove includes a continuous groove having a driving area that crosses a pivoting direction of the transmission pin at a predetermined angle to displace the blade and a non-driving area that crosses the pivoting direction of the transmission pin at a substantially right angle to reduce displacement applied to the blade.

6 Claims, 9 Drawing Sheets

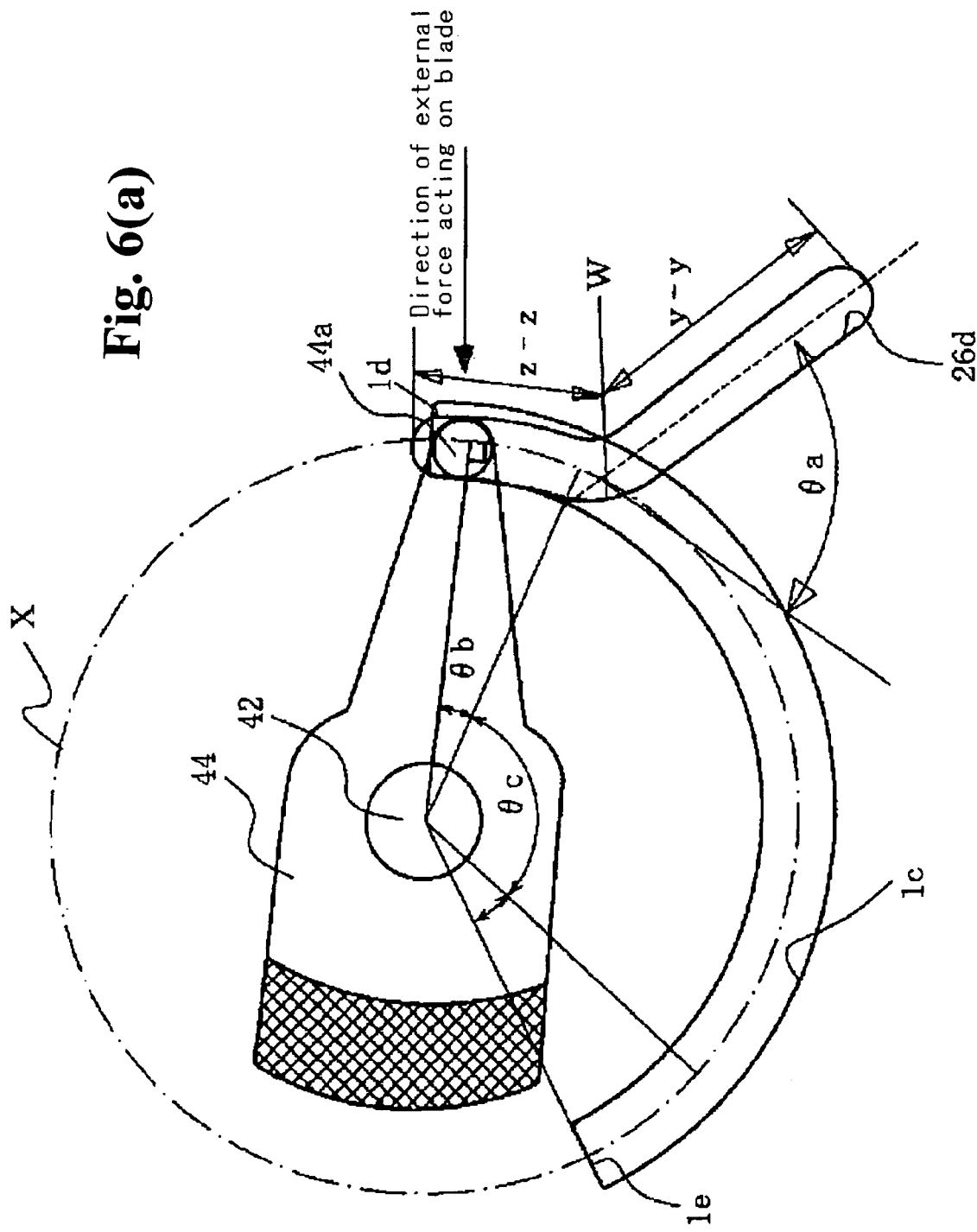

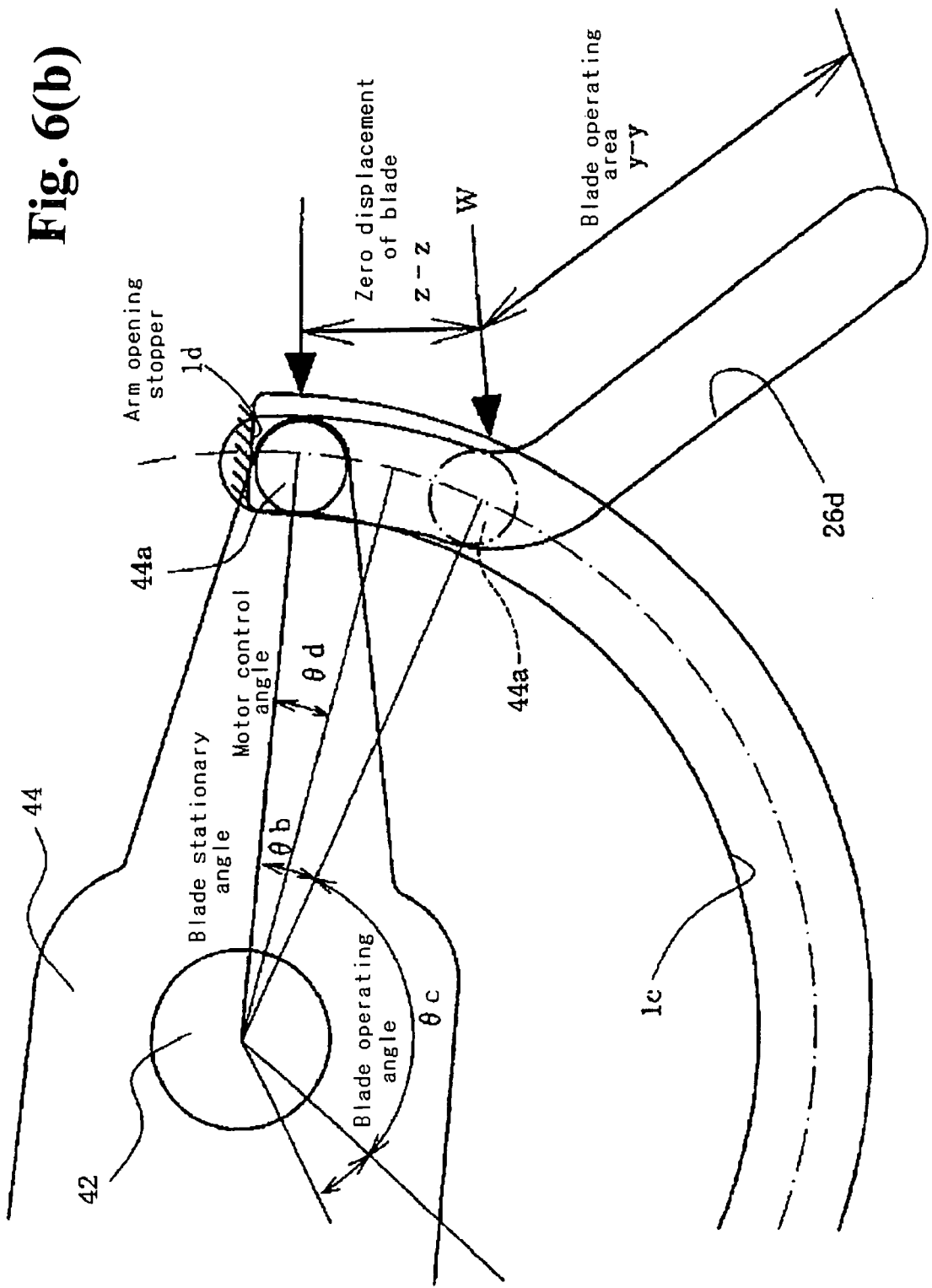

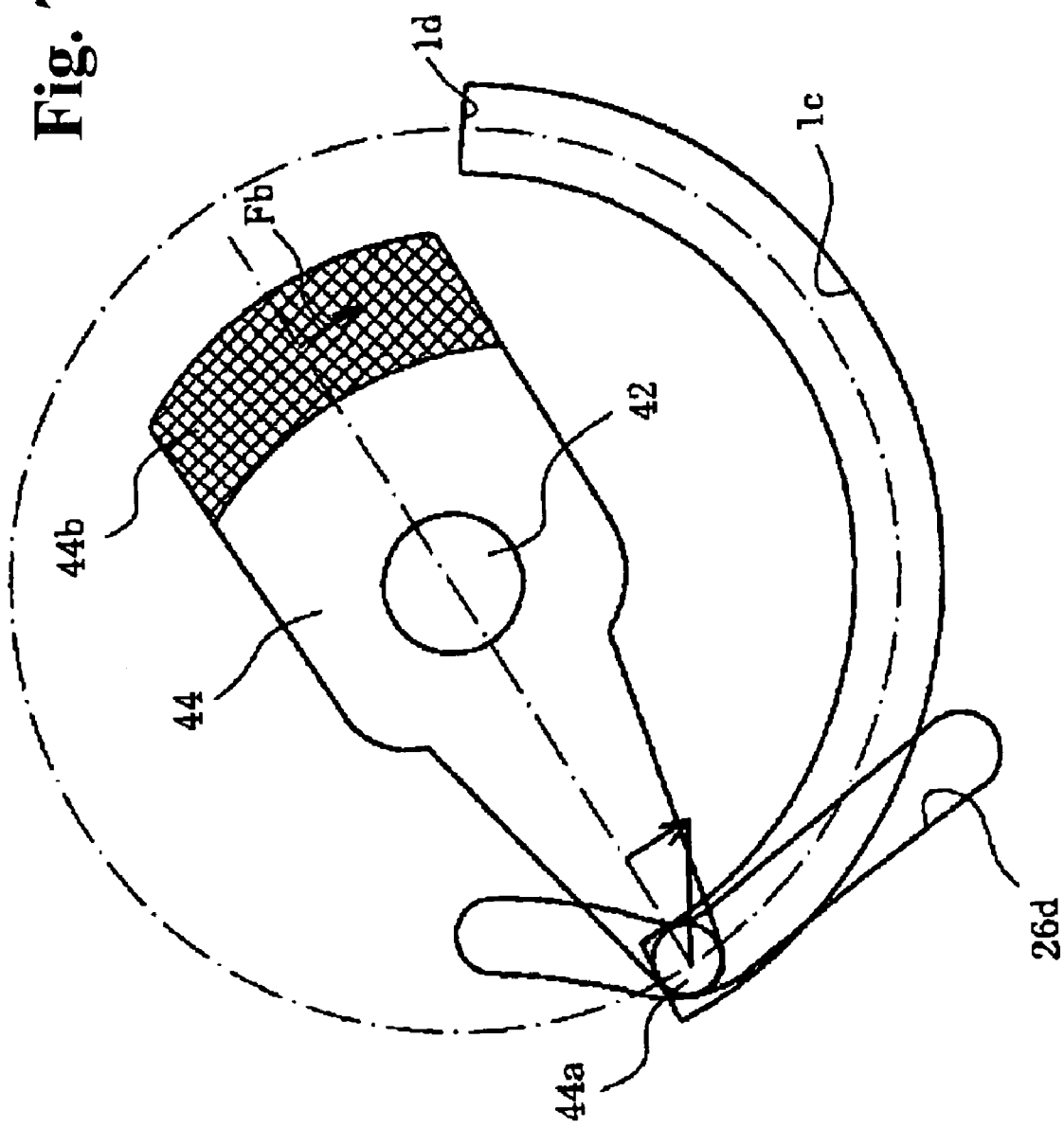

LIGHT QUANTITY ADJUSTING DEVICE

BACKGROUND OF THE INVENTION AND RELATED ART STATEMENT

The present invention relates to light quantity adjusting devices provided in still cameras, video cameras, or other image pickup apparatuses to drivingly open and close blades such as shutter blades or restricting blades to adjust the quantity of photographing light. In particular, the present invention relates to improvements in operation mechanisms for the blades such that the operation mechanisms can smoothly operate the blades.

In general, the light quantity adjusting device adjusts the quantity of light for a shutter or a diaphragm by using an electromagnetic driver to open and close a blade located on a photographing optical axis of a camera or the like. The electromagnetic driver magnetically rotates a rotor rotatively provided in a stator to open and close the blade.

There has been a strong demand for a reduction of size of the electromagnetic driving light quantity adjusting device. For example, a camera incorporated into a small-sized instrument such as cellular phone, light quantity adjusting device such as shutter blade or restricting blade are required to have a drastically reduced size and reduced power consumption. Thus, a driving mechanism that opens and closes the blade is small and light. In particular, the diameters of a magnet and an exciting coil have been significantly reduced. For example, the diameter of a yoke has been reduced to about 5 to 6 mm.

The reduced size of the driver reduces the mass of a driving rotating portion, possibly causing, for example, a hunting phenomenon. In this phenomenon, when the blade is topped by abutting against a stopper, the entire driving system vibrates. The hunting phenomenon of the driving system varies between a light quantity adjusting blade composed of one blade and a light quantity adjusting blade composed of two blades that are opened and closed in the opposite directions. If the light quantity adjusting blade is composed of one blade, all of the impact resulting from striking of the blade against the stopper acts on a driving arm provided on a driving rotating shaft. This causes damped vibration in the arm and blade. On the other hand, if the light quantity adjusting blade has two blades, an impact on the blade acts on the right and left arms provided on the driving rotating shaft in the opposite directions. This prevents a possible significant phenomenon.

In connection with opening and closing of the blade by the electromagnetic driver, for example, Japanese Patent Laid-Open No. 11-194384 proposes that the blade be prevented from being moved at a fully open position or a closed position by the jolting driving system. Japanese Patent Laid-Open No. 11-194384 discloses a mechanism in which a transmission pin is provided for a rack gear coupled to a stepping motor and is engaged with a slit-like cam groove formed in the blade so that the rack gear slides to open and close the blade via the cam groove in a direction orthogonal to that in which the rack gear slides. The inclination of the cam groove is varied so that in a certain groove area, the blade is not moved in the opening or closing direction in spite of movement of the transmission pin.

As described above, to deal with the impact caused in case the blade is opened and closed by the electromagnetic driver and abuts against the stopper or the like at the fully open and fully closed positions, two blades are combined together so as to open and close in the opposite directions and the opposite ends of the driving arms provided on the driving rotating shaft are engaged with the slit-like cam groove formed in the blades. The opposite ends of the arms cause the impact acting on the blades in the opposite directions relative to the driving rotating shaft to prevent hunting from occurring in the blade and driving system as a result of vibration. Also in this case, a hunting phenomenon may occur in which the blade is vibrated by jolting of a driving system such as the engaging portion of the cam groove. However, the blade, including a driving system such as a motor, does not vibrate violently.

On the other hand, Japanese Patent Laid-Open No. 11-194384, described above, discloses that the cam groove formed in the blade and the driving pin are appropriately shaped so that when the blade is stopped, no driving force is transmitted from the transmission pin to the cam groove. However, Japanese Patent Laid-Open No. 11-194384 does not make any proposal for prevention of a hunting phenomenon that may occur when the blade is stopped.

However, if the blade is composed of one blade, the driving arm, attached to the driving rotating shaft, needs to extend from the rotating shaft toward the blade like a cantilever. This biases the arm of the rotating shaft toward one side. In this case, the reduced mass of the rotor including the rotating shaft may cause the rotating shaft to vibrate rotatively as a result of an impact acting on the driving arm when the blade is stopped. When combined with the electromagnetic rotation of the rotor, the rotative vibration is disadvantageously intensified, resulting in a long time required for stabilization. Accordingly, the blade composed of one blade causes mechanical and magnetic unbalance in the driving system drivingly opening and closing the blade. Unfortunately, an impact on the blade intensifies the vibration of the driving system, making the hunting phenomenon of the blade significant.

Moreover, owing to the magnetic unbalance in the driving system, when a stepping motor is used as a driver, a change of rotor step angle from that at the blade stop position causes a magnetic attractive force to act on the rotor, intensifying vibration. Thus, the reduced mass of the driving mechanism may result in more violent vibration and a more significant hunting phenomenon. Therefore, a reduction in size and weight of the driving mechanism may disadvantageously affects the operation of opening and closing the blade.

An object of the present invention is to provide a light quantity adjusting device that prevents possible violent vibration resulting from an external force such as an impact acting on a blade even when a driving mechanism for opening and closing the blade has a reduced size and a reduced weight, so that the light quantity adjusting device enables the blade to be controllably opened and closed stably.

Another object of the present invention is to provide a light quantity adjusting device that can accurately and stably adjust the quantity of light without causing a hunting phenomenon even when a driving mechanism for a single blade used to adjust the photographing light quantity has a reduced size and a reduced weight.

Further objects and advantages of the invention will be apparent from the following description of the invention.

SUMMARY OF THE INVENTION

The present invention employs a configuration described below to accomplish the above objects.

A light quantity adjusting device comprises a substrate having an optical path aperture, a blade movably placed on the substrate to restrict the quantity of light passing through the optical path aperture, and electromagnetic driving means for drivingly opening and closing the blade. The electromagnetic driving means comprises a rotating shaft, an arm integrated with the rotating shaft, and a transmission pin provided on the arm. The blade has a cam groove formed therein and engaging with the transmission pin. The cam groove comprises a continuous groove having a driving area that crosses a pivoting direction of the transmission pin at a predetermined angle to displace the blade and a non-driving area that crosses the pivoting direction of the transmission pin at a substantially right angle to reduce displacement applied to the blade. The arm has a weight located opposite the transmission pin via the rotating shaft to apply an inertia force to the transmission pin, the inertia force substantially balancing with the force of the transmission pin and acting in a direction opposite to that of force of the transmission pin.

The non-driving area of the cam groove is formed so as to engage the transmission pin in an open position in which the blade opens the optical path aperture. The driving area of the cam groove is set so that in a closed position where the blade closes the optical path aperture, the inertia force acting on the transmission is substantially equal to that exerted on the arm by the weight, with rotating forces of opposite directions applied to the rotating shaft.

The present invention also provides a light quantity adjusting device comprising a substrate having an optical path aperture, one blade movably placed on the substrate to restrict the quantity of light passing through the optical path aperture, and electromagnetic driving means for drivingly opening and closing the blade. The electromagnetic driving means comprises a rotating shaft, an arm integrated with the rotating shaft, and a transmission pin provided on the arm. The blade has a cam groove formed therein and engaging with the transmission pin. The cam groove comprises a continuous groove having a driving area that crosses a pivoting direction of the transmission pin at a predetermined angle to displace the blade and a non-driving area that crosses the pivoting direction of the transmission pin at a substantially right angle to reduce displacement applied to the blade.

The arm has a weight located opposite the transmission pin via the rotating shaft to apply an inertia force to the transmission pin, the inertia force substantially balancing with the force of the transmission pin and acting in a direction opposite to that of the force of the transmission pin. Settings are made so that in an open position in which the blade opens the optical path aperture, the transmission pin engages the non-driving area of the cam groove, and in a closed position where the blade closes the optical path aperture, the inertia force acting on the transmission is substantially equal to that exerted on the arm by the weight, with rotating forces of opposite directions applied to the rotating shaft. The electromagnetic driving means comprises a stepping motor that performs rotational control at a predetermined step angle. The non-driving area is formed over an angular range of the transmission arm which is larger than the step angle.

BRIEF DESCRIPTION OF THE DRAWINGS

FIG. 6(a) is a diagram of a transmission mechanism in the device in FIG. 1, showing how a transmission arm and the blade engage with each other in an open position;

FIG. 6(b) is an enlarged diagram of the transmission mechanism in the device in FIG. 1, illustrating an essential part of FIG. 6(a);

FIG. 7(a) is a diagram of the transmission mechanism in the device in FIG. 1, showing how the transmission arm and the blade engage with each other in a closed position.

DETAILED DESCRIPTION OF PREFERRED EMBODIMENTS

Figure 1:
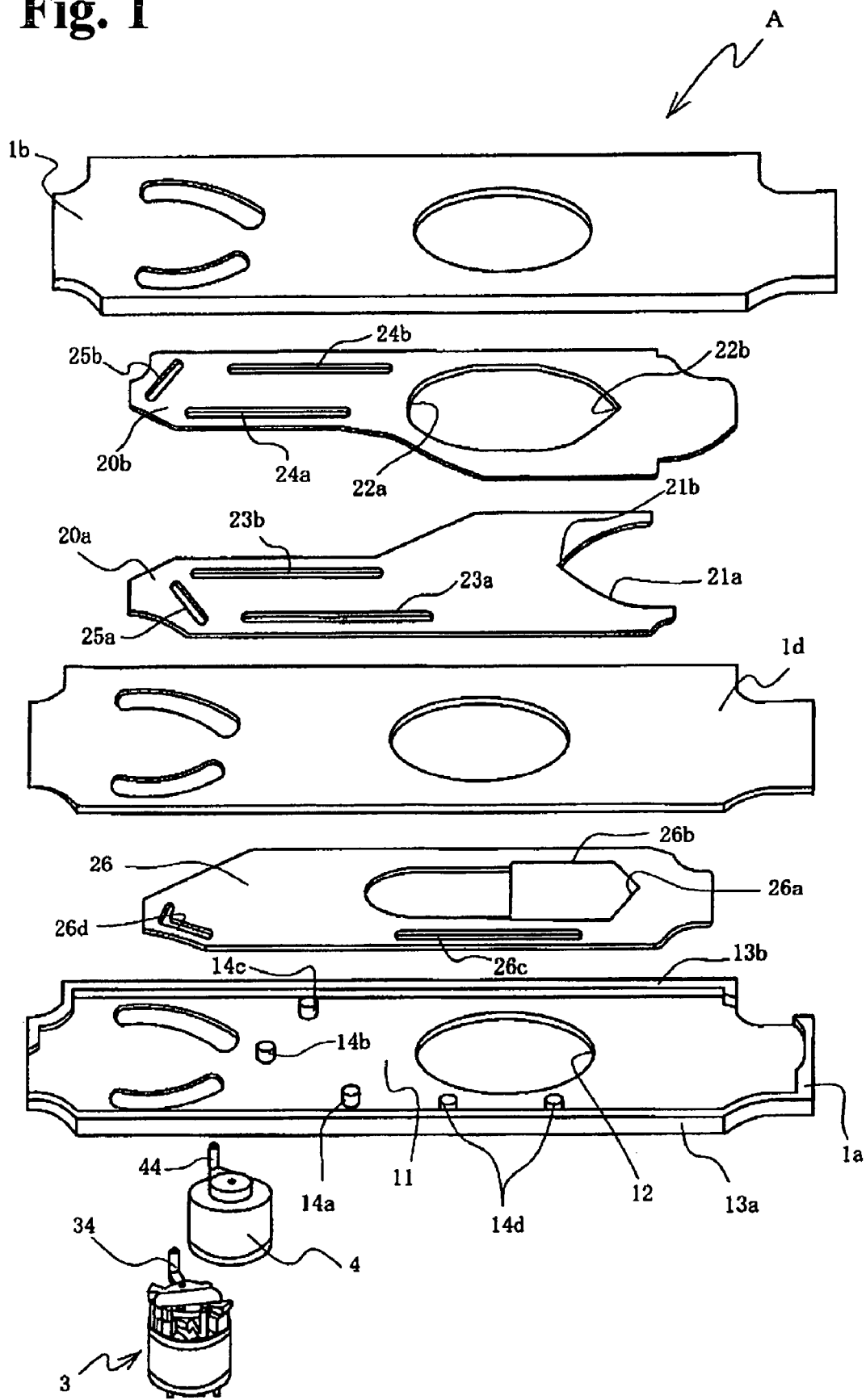
FIG. 1 is an exploded perspective view of a light quantity adjusting device in accordance with the present invention.
Figure 2:
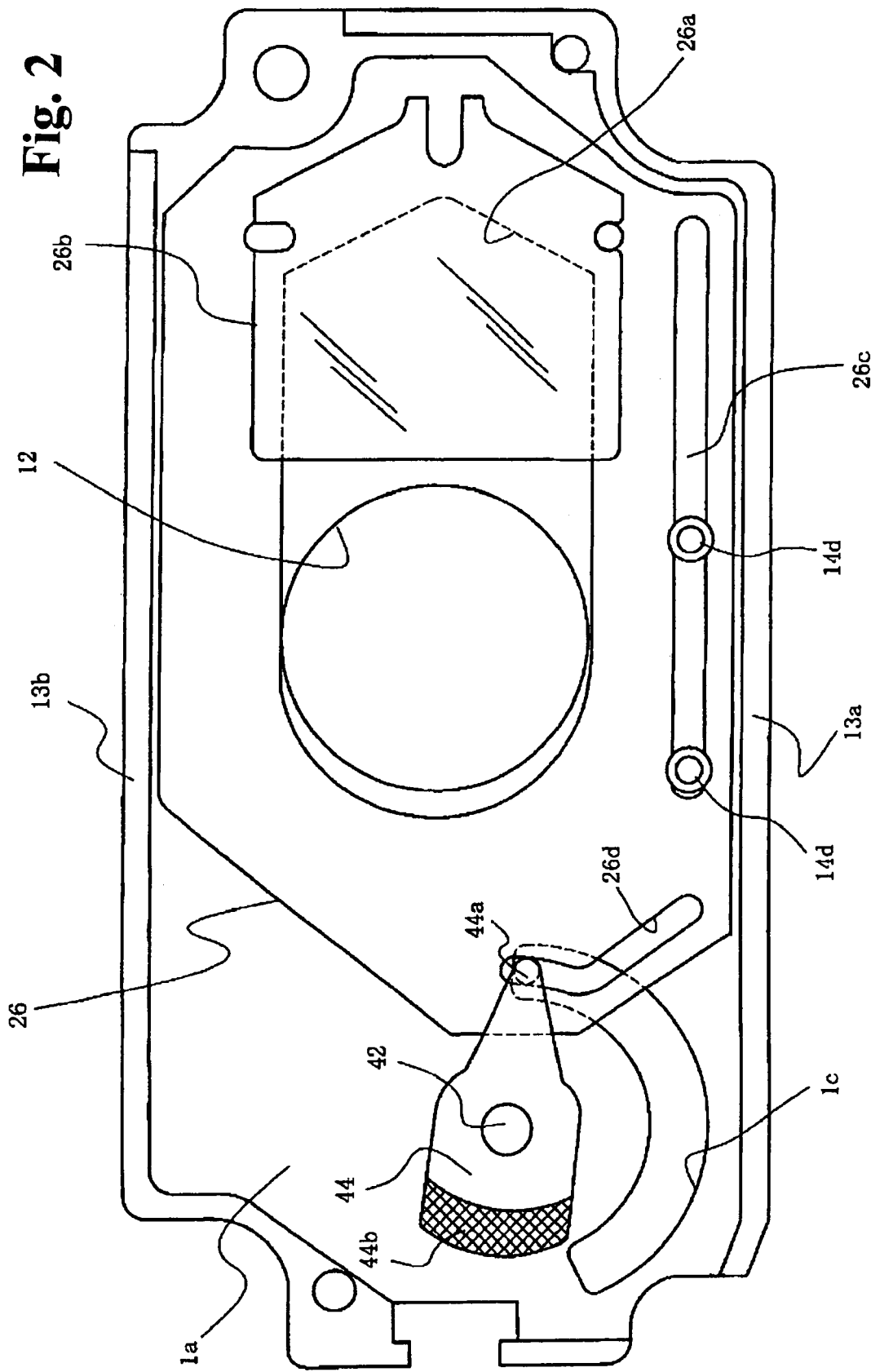
FIG. 2 is a diagram illustrating an open position of a filter blade in the device in FIG. 1.
Figure 3:
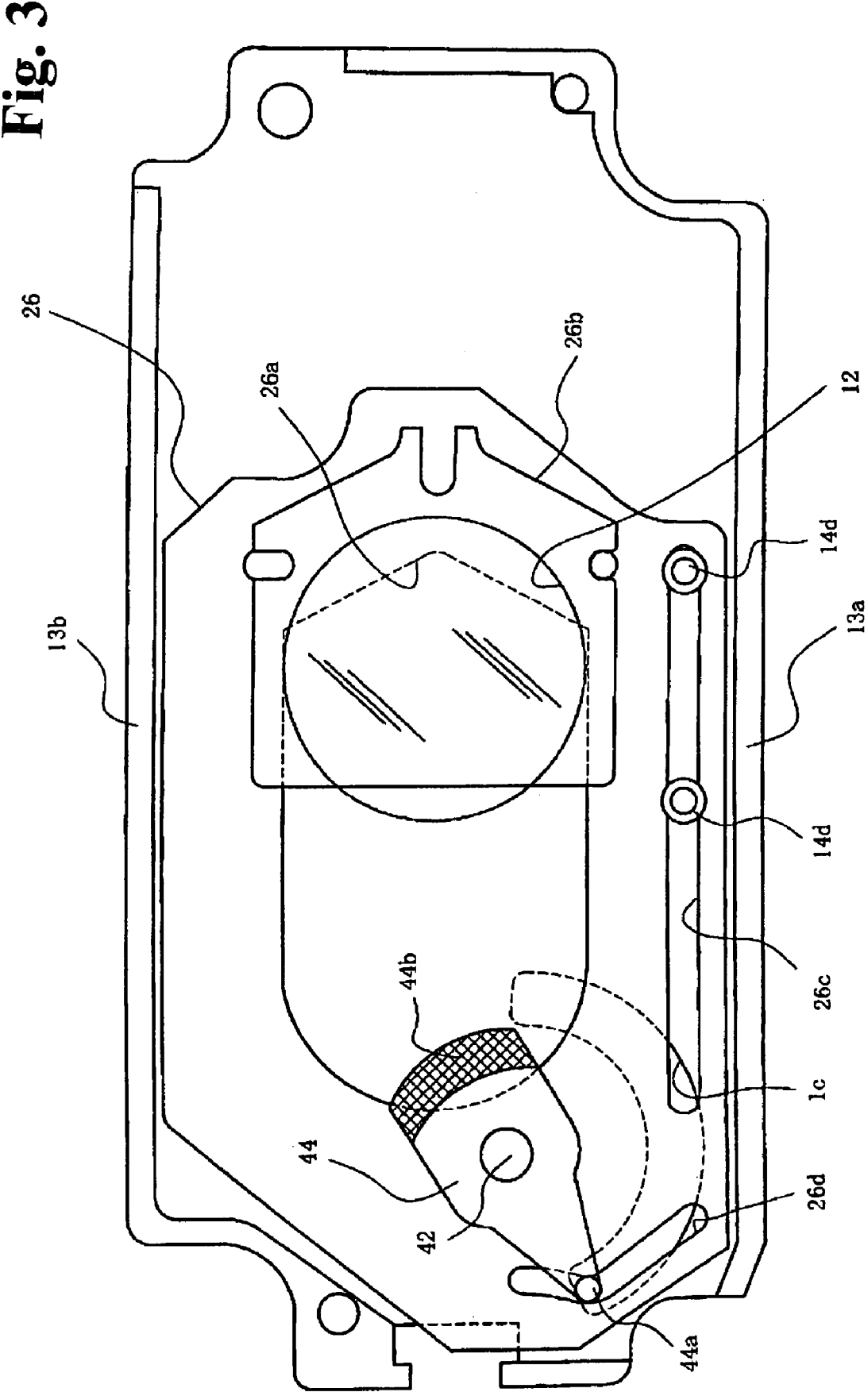
FIG. 3 is a diagram illustrating a closed position of a filter blade in the device in FIG. 1.
Figure 4:
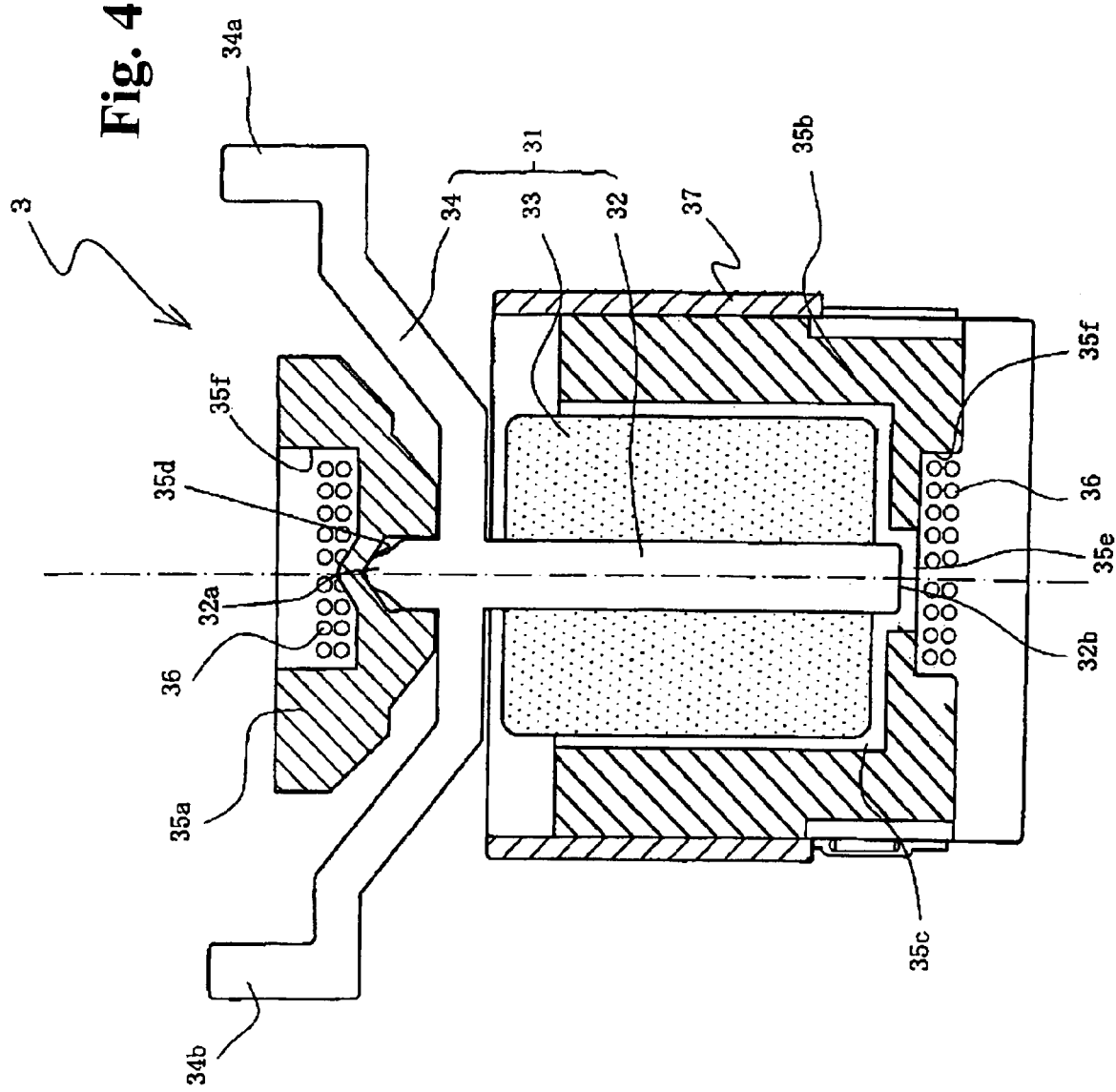
FIG. 4 is a vertical sectional view of a driver (electromagnetic driver) for a restricting blade in the device in FIG. 1.
Figure 5:
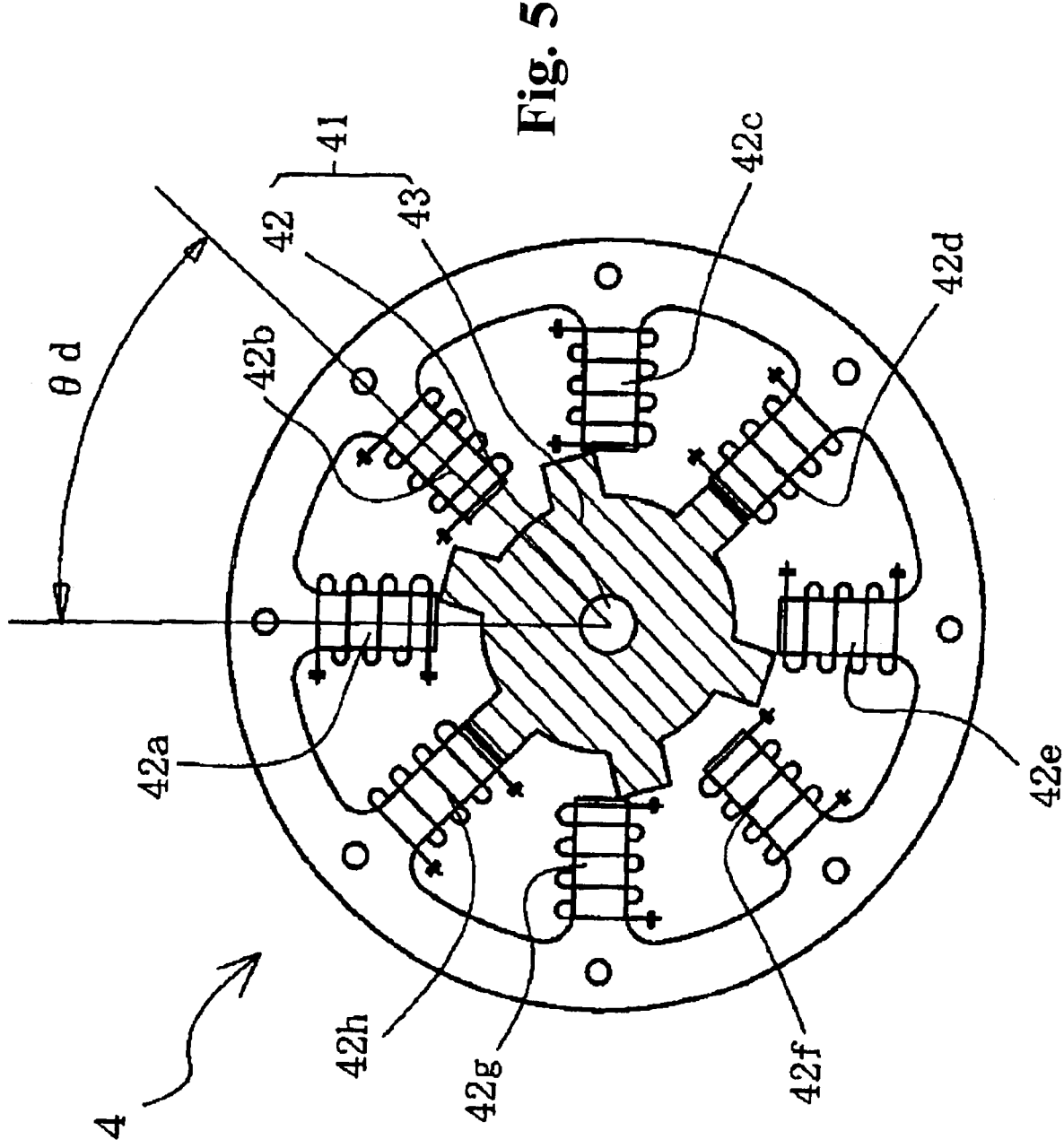
FIG. 5 is a conceptual drawing illustrating a driver (stepping motor) for the filter blade in the device in FIG. 1.

The present invention will be described on the basis of an illustrated preferred embodiments. FIG. 1 is an exploded perspective view of a light quantity adjusting device in accordance with the present invention. FIG. 2 is a diagram illustrating an open position of a blade (a filter blade described below). FIG. 3 is a diagram illustrating a closed position of the blade. FIG. 4 is a vertical sectional view of a driver for a restricting blade different from the filter blade. FIG. 5 is a horizontal sectional view of a driver for the filter blade.

The general configuration of a light quantity adjusting device A will be described with reference to FIG. 1. As shown in FIG. 1, the light quantity adjusting device A in accordance with the present invention is composed of a substrate 1, a blade 2, and a driver 3. The substrate 1 is composed of a flat base plate 1a and a retainer plate 1b laid on top of the base plate 1a with a small gap formed between the base plate 1a and the retainer plate 1b. The base plate 1a is shaped to a space in a camera into which a photographing lens barrel is incorporated. The base plate 1a is formed by, for example, molding a synthetic resin with a high heat resistance and a high mechanical strength or pressing a metal plate.

The base plate 1a has a blade supporting surface 11 and an optical path aperture 12 formed in its center and a flange 13 formed around its periphery. A first blade 20a and a second blade 20b are supported on the blade supporting surface 11 so as to be piled together. The first and second blades 20a and 20b lie to face an optical path aperture 12. In the figure, each of the first and second blades 20a and 20b is composed of a restricting blade that restricts the optical path aperture 12 to a larger or smaller diameter. The first blade 20a has a semicircular opening 21a with a narrowed portion 21b in its center. The second blade 20b has a circular opening 22a with a narrowed portion 22b in its center. The openings 21a and 22a in the first and second blades 20a and 20b are located to face the optical path aperture 12. Then, the diameter of the optical path aperture 12 is reduced by sliding the first and second blades 20a and 20b closer to each other relative to the optical path aperture 12. In contrast, the diameter of the optical path aperture 12 is increased by sliding the first and second blades 20a and 20b away from each other relative to the optical path aperture 12. This enables the quantity of light to be adjusted in accordance with photographing conditions.

Thus, each of the first and second blades 20a and 20b has its opposite side edges guided and supported by opposite side walls 13a and 13b of the flange 13 of the base plate 1a so as to be slidable in the lateral direction of FIG. 1. Further, the first blade 20a has slit grooves 23a and 23b, and the second blade 20b has similar slit grooves 24a and 24b. Guide pins 14a, 14b, and 14c are provided on the blade supporting surface 11 of the base plate 1a and fitted in the slit grooves 23a, 23b, 24a, and 24b.

The illustrated guide pin 14a is fitted in the slit groove 24a. The pin 14b is fitted in the slit grooves 23a and 24b. The pin 14c is fitted in the slit groove 23b. Consequently, the first and second blades 20a and 20b are guided by the opposite side walls 13a and 13b of the flange 13 and the guide pins 14a, 14b, and 14c to move linearly in the lateral direction of FIG. 1. Cam grooves 25a and 25b are formed in the blades 20a and 20b, respectively, in a direction crossing a sliding direction at a predetermined angle. A driving arm 34 of the driver 3, described below, engages the cam grooves 25a and 25b.

Thus, the present invention has the features as follows. A filter blade 26 is located to face the optical path aperture 12 so as to freely open and close similarly to the restricting blades 20a and 20b. The filter blade 26 is drivingly opened and closed by a driver 4 different from the driver 3, described above. The filter blade 26 has a reduced size and a reduced weight. This transmission mechanism can smoothly open and close the blade without posing any problem such as hunting.

The filter blade or blade 26 has a slot-like opening that extends beyond the optical path aperture 12. A translucent filter plate (ND filter) 26b is stuck to the opening 26a. In a fully open state in FIG. 2, the optical path aperture 12 is fully open without being covered by the filter plate (ND filter) 26b. In a state in FIG. 3 in which the filter blade 26 is closed, the optical path aperture 12 is covered by the filter blade 26 to reduce the quantity of light passing through the optical path aperture 12. Thus, the filter blade 26 has its opposite side edges slidably supported on the opposite side walls 13a and 13b of the flange 13 of the base plate 1. A guide slit 26c is further integrally formed in the filter blade 26 by punching, and fittingly supported by guide pins 14d installed on the base plate 1a. Accordingly, the filter blade 26 is supported so as to be movable in the lateral direction of FIG. 2 along the guide pins 14d and opposite side walls 13a and 13d. Reference numeral 1d in the filter denotes an intermediate substrate located between the filter blade 26 and restricting blades 20a and 20b, arranged on the base plate 1a, to support the blades.

While the blade 2 is installed on a front surface of the base plate 1a, a mounting portion 15 for the drivers 3 and 4 is provided on a rear surface of the base plate 1a. The driver 3 is composed of an electromagnetic driver shown in FIG. 4. The driver 4 is composed of a stepping motor shown in FIG. 5. First, the electromagnetic driver 3 will be described. As shown in FIG. 4, the electromagnetic driver 3 is composed of a rotor set 31 and a stator set 38. The rotor set 31 is composed of a rotor shaft 32, a permanent magnet 33, and a driving arm 34. In the illustrated rotor set 31, the rotor shaft 32 (hereinafter referred to as the "rotating shaft") is integrally fixed in the center of the cylindrical permanent magnet 33. The driving arm 34 is integrally fixed to the rotating shaft 32. The permanent magnet 33 comprises a ferrite magnet, a neodymium magnet, or the like baked into a cylinder with an axial hole in the center. The rotating shaft 32, obtained by metal or molding resin, is penetratingly inserted into the axial hole for integration.

The thus integrated permanent magnet 33 and rotating shaft 32 are further integrated with a driving arm 34. The illustrated driving arm 34 is integrated with the rotating shaft 32 and composed of a first arm 34a and a second arm 34b extending in the radial direction of the rotating shaft 32, to transmit rotation of the rotating shaft 32 to the blade 2. The driving arm 34 may be molded of resin or the like integrally with the rotating shaft 32 or separately molded and secured to the rotating shaft with an adhesive or the like as shown in the figure. In this case, with the rotating shaft with a reduced diameter (smaller diameter), reliable integration can be achieved by capping both an end surface of the permanent magnet and the rotating shaft before bonding them together.

The rotor set 31 is pivotally retained in the state set 38, described below. The stator set 38 is composed of a coil frame 35, an exciting coil 36 wound around the coil frame, and a yoke 37 serving as a housing shield. The coil frame 35 is shaped like a cylinder divided into two in the lateral or vertical direction of FIG. 3 so that the rotor set 31 can be retained in the coil frame 35. The coil frame 35 is normally formed of a synthetic resin and divided into two pieces like cups in the vertical direction or into two pieces in the lateral direction around the rotating shaft 32. In the figure, the coil frame 35 is divided into two pieces in the vertical direction, i.e. an upper coil frame 35a and a lower coil frame 35b. When merged together, the upper and lower coil frames 35a and 35b comprise a cavity 35c in which the permanent magnet 33 is accommodated, bearings 35d and 35e that bear the first and second shaft ends 32a and 32b of the rotating shaft 32, and a coil winding groove 35f around the outer periphery of which an exciting coil is wound. The exciting coil 36 is wound around the coil winding groove 35f, with the yoke 37 fitted around the outer periphery of the exciting coil 36.

Cam grooves 25a and 25b formed in the restricting blades (first and second blades) 20a and 20b are coupled to the first arm 34a and second arm 34b of the driver 3. An urging piece of a soft magnetic material is located in the stator set 38 in the driver 3 to magnetically attract the permanent magnet 33 in the rotor set 31 to hold the restricting blades 20a and 20b in a fully open position (maximum restricted diameter) and a fully closed position (minimum restricted diameter). Accordingly, energizing the exciting coil 36 causes the driver 3 to drivingly open or close the pair of blades to any restricted diameter between the fully open position and the fully closed position. Deenergizing the exciting coil causes the driver 3 to hold the blades 20 in the fully open position or the fully closed position.

Now, the driver 4 will be described. The driver 4 is composed of a stepping motor. As shown in FIG. 5, a plurality of exciting coils 42a, 42b, and 42c are arranged around a magnet rotor 41. The rotor 41 is composed of a rotating shaft 42 and a permanent magnet 43 and pivotally supported by a housing frame (not shown). The outer periphery of the permanent magnet 43 is divided into a plurality of poles. The magnetic poles of the permanent magnet 43 correspond to the number of poles constituted by the exciting coil 42. A transmission arm 44 is integrally attached to the rotating shaft 42 of the rotor 41.

The transmission arm 44 extends in a radial direction of the rotating shaft 42 like a cantilever as shown in the figure. A transmission pin 44a is provided at the tip of the transmission arm 44 and engages the filter blade 26, described above. A weight 44b is provided opposite the transmission pin 44a across the rotating shaft 42. On the other hand, a cam groove 26d is formed in the filter blade 26. As shown in FIG. 6(a), the cam groove 26d has a driving area x-y that crosses a rotation trajectory X of the transmission pin 44a at a predetermined angle θa, a non-driving area z-z that crosses the rotation trajectory X at substantially right angle, and a balance area w formed at the boundary between the driving area and the non-driving area. Thus, the cam groove 26d is composed of a continuous groove with which the transmission pin 44a engages. The cam groove 26d comprises the driving area y-y, in which rotation of the transmission pin 44a movably displaces the filter blade 26 in the lateral direction of the figure, and the non-driving area z-z, in which the filter blade 26 is not displaced or is displaced only by a small set amount. The bent portion w is formed at the boundary between the driving area y-y and the non-driving area z-z, and forms the balance area, described below.

The operation of the cam groove will be described. The filter blade 26 is supported by the guide pins 14d between the open position (fully open) in FIG. 2 and the closed position (fully closed) in FIG. 3 so as to be movable in the lateral direction. As shown in FIG. 6(a), which shows the state in FIG. 2 in an enlarged view, in the open position, the transmission pin 44a is locked by a right limit stopper 1d in a clearance groove 1c formed in the substrate 1 (base plate 1a). The transmission pin 44a thus does not move counterclockwise as shown in FIG. 6(b). The non-driving area z-z is formed through an illustrated angle θb from the fully open position.

Accordingly, (1) even when the transmission pin 44a collides against the right limit stopper 1d and rebounds, the filter blade 26 is held in the fully open position. Further, the angle θb is larger than the step angle θc of the stepping motor 4, shown in FIG. 5; θb≧θc. Thus, (2) when an external force of a closing direction (the direction of arrows in FIG. 6(b)) acts on the filter blade 26 in the fully open position, even though the external force pivots the transmission arm 44 clockwise, the magnet rotor 41 is magnetically held owing to the control step angle θc of the stepping motor 4. Thus, even when a rebound force or an external force such as an impact acts on the filter blade 26 in the open position, the filter blade 26 is held in the open position. (3) On the other hand, with the driver 4 composed of a stepping motor, setting θb≧θc as described above eliminates the need to adjust the step angular position during device assembly even when the open position of the filter blade 26 does not coincide with the control step angle θc. In other words, the stepping motor need not be assembled so that the angular position at which the rotor is magnetically held coincides with the open position (stopper 1d position) of the filter blade 26.

Now, the operation of the driving area y-y of the cam groove 21c will be described. The area y-y is formed to cross the rotation trajectory X of the transmission pin 44a at an angle θa as shown in FIG. 6(a). When the transmission arm 44 in the state shown in FIG. 6(a) is rotated clockwise in the same figure, the transmission pin 44a does not drive the filter blade 26 in the non-driving area z-z but drives the filter blade 26 leftward in the figure (upward in FIG. 2) at the angular position where the transmission pin 44a engages the driving area y-y. Then, the ND filter 26a of the filter blade 26 gradually covers the optical path aperture 12 and entirely covers the optical path aperture 12 at the closed position shown in FIG. 7(a).

Figure 7B:
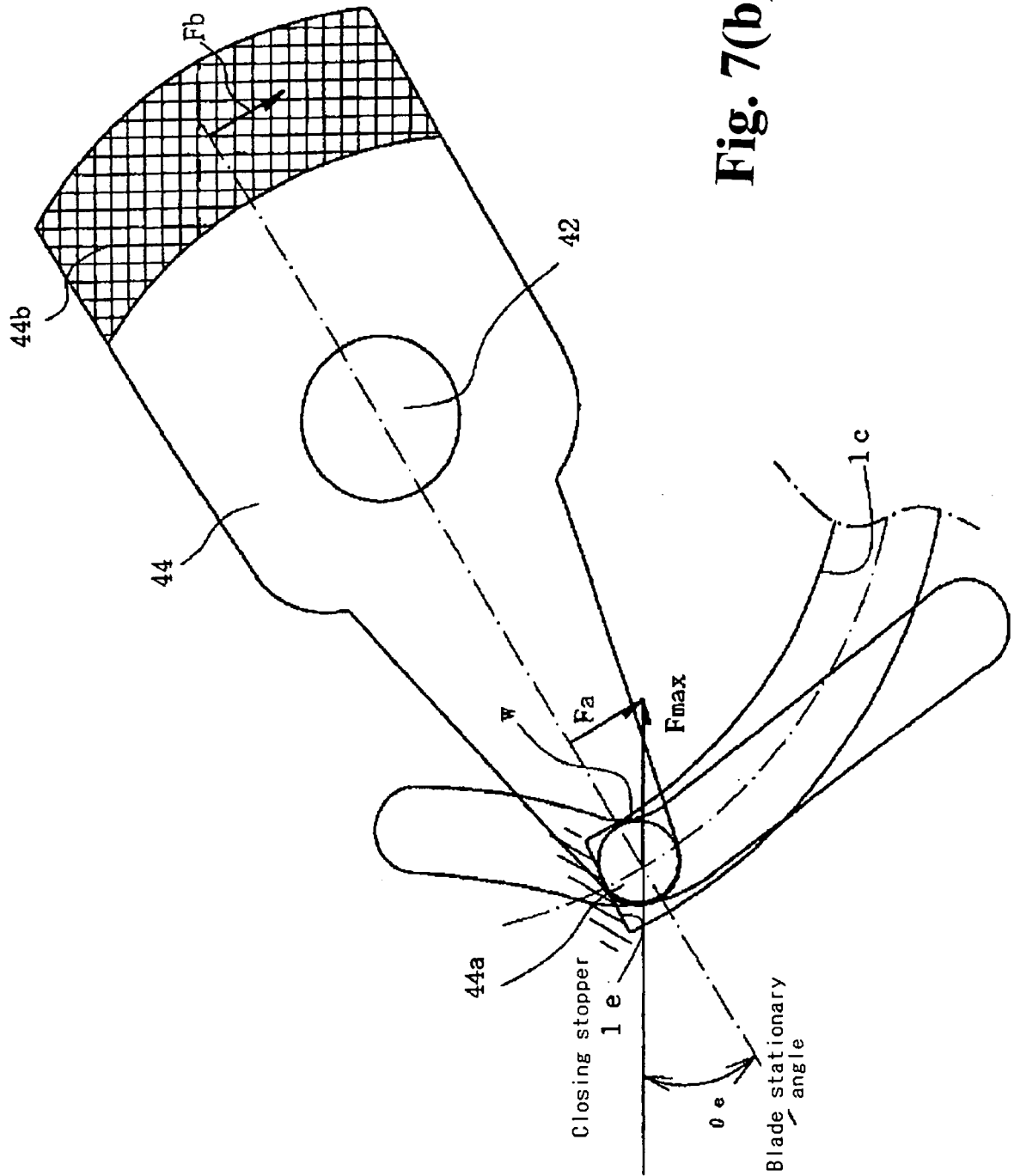
FIG. 7(b) is an enlarged diagram of an essential part of FIG. 7(a).

In the closed position, the transmission pin 44a is located in the bent portion (hereinafter referred to as the "balance area") w, formed at the boundary between the driving area y-y and non-driving area z-z of the cam groove 21c. This state is shown in FIG. 7, where the transmission pin 44a abuts against a left limit stopper 1e of the clearance groove 1c and is stopped. The weight 44b is set so that at this time, a rebound force Fmax acting on the transmission pin 44a balances with the inertia force Fb of the weight 44b to prevent the transmission arm 44 from pivoting counterclockwise in FIG. 7. That is, the weight 44b is set so that a moment Fbmo acting on the arm as a result of the inertia force Fb of the weight 44b becomes larger than a moment Famo acting on the arm as a result of the rebound force acting on the transmission pin 44a and a partial force Fa of the maximum permissible force Fmax acting on the filter blade 26 (Famo<Fbmo).

Thus, (1) the weight 44b is set so that even when the filter blade 26 abuts against the left limit stopper 1e to exert the rebound force Fmax, the inertia force Fb acts to preclude the rotation of the transmission arm 44. This prevents the rebound force Fmax from causing hunting. Even if a hunting phenomenon occurs, the resulting vibration is attenuated to allow the filter blade 26 to remain stationary in the closed position. Further, (2) even when an external force such as an impact acts on the blade in the closed position, provided that the external force is equal to or weaker than the preset maximum permissible force Fmax, the inertia force Fb of the weight 44b allows the blade to remain stationary in the closed position without being moved. Even if the blade is vibrated, the vibration is quickly attenuated to keep the blade stationary.

Moreover, with the driver 4 composed of a stepping motor, setting the step angle θd smaller than a blade stationary angle θe, that is, setting θe>θd, eliminates the need to align the control step position of the stepping motor with the left limit stopper 1e. Thus, with the driver 4 composed of a stepping motor, even when the motor is composed of a small-sized motor with a small capacity and low power consumption, for example, a micro stepping motor, the step angular position of the rotor need not be aligned with the stopper position of the blade. In particular, even when an error occurs in pulse count during the pulse control of the motor, the filter blade 26 is ensured to remain stationary in the closed position provided that the angular position of the rotor falls within the range of the maximum stationary angle θe.

Now, description will be given of the operation of the restricting blades 20a and 20b, described above. The light quantity adjusting device A configured as described above is incorporated into an image pickup apparatus such as a camera to adjust the quantity of light passing through the optical path aperture 12. The restricting blades 20a and 20b are controlled by the driver 3, described above, to move in the opposite directions to cover the optical path aperture so as to adjust its diameter in accordance with photographing conditions. Then, with the diameter through which a quantity of light passes reduced to a predetermined value, the driver 4 controls whether the ND (Neutral Density) filter of the filter blade 26 is used or not. Selection of use of the ND filter allows the adjustment of the quantity of light passing through the diaphragm aperture. The ND filter may be configured to have at least two density difference levels.

In the abode disclosure, the present invention is adopted for the case where the blade is composed of the filter blade 26, which has the ND filter. However, the blade may be composed of a restricting blade or a shutter blade. If the blade is composed of a restricting blade, for example, a blade with a diaphragm aperture formed in its center and having a smaller diameter than the optical path aperture is movably mounted so as to pass through the optical path aperture. If the blade is composed of a shutter blade, it is configured as a guillotine blade.

As described above, to allow the blade to be drivingly opened and closed appropriately by the arm of the driving rotating shaft, the non-driving area corresponding to the fully open or closed position of the blade is formed in the cam groove. Further, the arm has the weight. Consequently, even when the driving rotating shaft has a cantilever-like arm to open and close a single blade, a possible hunting phenomenon resulting from vibration of the blade can be prevented. Further, even with an external force such as an impact acting on the blade, the blade can be held in the fully open or closed position.

That is, even if the driving rotating shaft overruns in the fully open or closed position, this is not transmitted to the blade. In contrast, even if an impact attributed to a stopper or the like acts on the blade, the resulting vibration is not transmitted to the arm for amplification. Furthermore, the arm has the weight located, via the rotating shaft, opposite the transmission pin, which engages the cam groove in the blade. This prevents vibration during rotation of the arm. For example, stable, smooth rotational driving can be achieved even with, for example, the reduced size and weight of the rotor. This enables a reduction in the size and weight of the driving mechanism including the blade. Thus, a possible hunting phenomenon is prevented in which the blade vibrates in fully open or closed. Further, even with an external force such as an impact acting on the blade in the fully open or closed position, the arm is held in the fully open or closed position because in the non-driving area of the cam groove, the arm is subjected to the magnetic stationary force of the driving motor or the like and the stationary force attributed to the inertia of the weight.

Moreover, the cam groove in the blade has the non-driving area and weight corresponding to the fully open or closed position of the blade. Accordingly, even if the use of a stepping motor performing step control on the driving rotor at predetermined angles prevents the controlling angular position of the stepping motor from aligning with fully open or closed position of the blade (displacement), the stopper position of the blade need not be aligned with the control angle of the motor. This makes it possible to roughly set the machining and assembly accuracies of the device, particularly, of components of the driving system. This in turn enables mass production of inexpensive devices that can perform stable opening and closing operations.

The present application claims priority from Japanese Patent Application No. 2006-174802 filed on Jun. 26, 2006 and the disclosure thereof is incorporated herein by reference.

While the invention has been explained with reference to the specific embodiments of the invention, the explanation is illustrative and the invention is limited only by the appended claims.

What is claimed is:

1. A light quantity adjusting device comprising:
    a substrate having an optical path aperture;
    a blade movably placed on the substrate to restrict quantity of light passing through the optical path aperture; and
    electromagnetic driving means for drivingly opening and closing the blade, the electromagnetic driving means comprising a rotating shaft, an arm integrated with the rotating shaft, and a transmission pin provided on the arm,
    wherein the blade includes a cam groove formed therein and engaging the transmission pin, the cam groove comprising a continuous groove having a driving area that crosses a pivoting direction of the transmission pin at a predetermined angle to displace the blade and a non-driving area that crosses the pivoting direction of the transmission pin at a substantially right angle to reduce displacement applied to the blade, and
    the arm has a weight located opposite the transmission pin via the rotating shaft to apply an inertia force to the transmission pin, the inertia force substantially balancing with a force of the transmission pin and acting in a direction opposite to that of force of the transmission pin.

2. The light quantity adjusting device according to claim 1, wherein the non-driving area of the cam groove is formed so as to engage the transmission pin in an open position in which the blade opens the optical path aperture.

3. The light quantity adjusting device according to claim 1, wherein the driving area of the cam groove is set so that in a closed position where the blade closes the optical path aperture, the inertia force acting on the transmission pin is substantially equal to that exerted on the arm by the weight, with rotating forces of opposite directions applied to the rotating shaft.

4. The light quantity adjusting device according to claim 1, wherein the electromagnetic driving means comprises a stepping motor that performs rotational control at a predetermined step angle, and the non-driving area is formed over an angular range of the transmission arm which is larger than the step angle.

5. The light quantity adjusting device according to claim 1, wherein the transmission pin is set so that in an open position in which the blade opens the optical path aperture, the transmission pin engages the non-driving area of the cam groove, and in a closed position where the blade closes the optical path aperture, the inertia force acting on the transmission pin is substantially equal to that exerted on the arm by the weight, with rotating forces of opposite directions applied to the rotating shaft.

6. The light quantity adjusting device according to claim 5, wherein the electromagnetic driving means comprises a stepping motor that performs rotational control at a predetermined step angle, and the non-driving area is formed over an angular range larger than the step angle with respect to the transmission arm.

* * * * *